United States Patent
Eismark (10) Patent No.: US 10,738,682 B2
(45) Date of Patent: Aug. 11, 2020

(54) PISTON CROWN FOR AN INTERNAL COMBUSTION ENGINE

(71) Applicant: VOLVO TRUCK CORPORATION, Gothenburg (SE)

(72) Inventor: Jan Eismark, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/063,179

(22) PCT Filed: Dec. 20, 2016

(86) PCT No.: PCT/EP2016/081993
§ 371 (c)(1),
(2) Date: Jun. 15, 2018

(87) PCT Pub. No.: WO2017/108837
PCT Pub. Date: Jun. 29, 2017

(65) Prior Publication Data
US 2019/0003372 A1    Jan. 3, 2019

Related U.S. Application Data

(63) Continuation-in-part of application No. PCT/EP2015/081011, filed on Dec. 22, 2015.

(51) Int. Cl.
*F02B 23/06* (2006.01)
*F02F 3/26* (2006.01)

(52) U.S. Cl.
CPC ...... *F02B 23/0651* (2013.01); *F02B 23/0627* (2013.01); *F02B 23/0669* (2013.01);
(Continued)

(58) Field of Classification Search
CPC .............. F02B 23/0651; F02B 23/0627; F02B 23/0678; F02B 23/0696; F02F 3/26
(Continued)

(56) References Cited

U.S. PATENT DOCUMENTS 5,215,052 A * 6/1993 Augustin ............ F02B 23/0651
123/276
5,868,112 A * 2/1999 Mahakul ............ F02B 23/0669
123/263
(Continued)

FOREIGN PATENT DOCUMENTS

CN    105051347 A    11/2015
CN    105121823 A    12/2015
(Continued)

OTHER PUBLICATIONS

International Search Report (dated Apr. 5, 2017) for corresponding International App. PCDEP2016/081993.
(Continued)

*Primary Examiner* — David Hamaoui
*Assistant Examiner* — John D Bailey
(74) *Attorney, Agent, or Firm* — Venable LLP; Jeffri A. Kaminski (57) ABSTRACT

A piston crown is provided for a piston in an internal combustion engine arrangement that includes a cylinder, the piston crown having a piston bowl surface adapted for facing a combustion chamber in the cylinder, wherein the piston bowl surface including a circumferential rim portion, a floor portion connected to and surrounded by the circumferential rim portion, a plurality of circumferentially spaced protrusions in the circumferential rim portion, at least one spray impingement portion, located between two adjacent protrusions. The spray impingement portion includes a reflection surface, being defined by that each possible normal to the reflection surface is directed towards a central axis of the piston, and forming an angle being within a range of a constant angle ±10° with the central axis, wherein the constant angle is at least 50°.

15 Claims, 6 Drawing Sheets

(52) U.S. Cl.
CPC ...... *F02B 23/0678* (2013.01); *F02B 23/0696* (2013.01); *F02F 3/26* (2013.01); *Y02T 10/125* (2013.01)

(58) Field of Classification Search
USPC ........................................................ 123/294
See application file for complete search history.

(56) References Cited

U.S. PATENT DOCUMENTS

| | | | | |
|---|---|---|---|---|
| 7,918,206 | B2* | 4/2011 | Eismark | F02B 23/0696 123/298 |
| 7,942,126 | B2* | 5/2011 | Zoller | F02B 23/0651 123/298 |
| 8,459,229 | B2* | 6/2013 | Rothbauer | F02B 23/0651 123/276 |
| 8,499,735 | B2* | 8/2013 | Eismark | F02B 23/0651 123/193.4 |
| 8,820,294 | B2* | 9/2014 | Fuqua | F01B 7/02 123/299 |
| 9,476,381 | B2* | 10/2016 | Bowing | F02B 23/0621 |
| 9,611,806 | B2* | 4/2017 | Subatch, Jr. | F02F 3/28 |
| 9,909,489 | B1* | 3/2018 | Koci | F02B 23/0627 |
| 10,060,386 | B2* | 8/2018 | Eismark | F02B 23/0651 |
| 10,393,063 | B2* | 8/2019 | Singh | F02B 23/06 |
| 2002/0073956 | A1* | 6/2002 | Suzuki | F02F 1/242 123/298 |
| 2010/0095928 | A1* | 4/2010 | Eismark | F02B 23/0696 123/298 |
| 2010/0258076 | A1* | 10/2010 | Eismark | F02B 23/0651 123/279 |
| 2011/0253094 | A1* | 10/2011 | Rothbauer | F02B 23/0693 123/276 |
| 2011/0253095 | A1* | 10/2011 | Rothbauer | F02B 23/0651 123/276 |
| 2011/0253096 | A1* | 10/2011 | Easley | F02B 23/0693 123/294 |
| 2011/0271931 | A1* | 11/2011 | Rothbauer | F02B 23/0672 123/279 |
| 2013/0047950 | A1* | 2/2013 | Eismark | F02B 23/0693 123/193.6 |
| 2013/0199493 | A1* | 8/2013 | Eismark | F02B 23/0627 123/294 |
| 2013/0220266 | A1* | 8/2013 | Bandyopadhyay | F02F 3/00 123/193.6 |
| 2015/0308371 | A1* | 10/2015 | Eismark | F02F 3/0015 123/193.6 |

FOREIGN PATENT DOCUMENTS

| | | |
|---|---|---|
| EP | 1528233 A1 | 5/2005 |
| EP | 1614874 A1 | 1/2006 |
| FR | 2887590 A1 | 12/2006 |
| JP | 2002122024 A | 4/2002 |
| WO | 2013030115 A2 | 3/2013 |

OTHER PUBLICATIONS

KR20120072746 (Jul. 4, 2012) Abstract.
Office Action in corresponding CN Application No. 201680075824.2, 10 pages.

* cited by examiner

PISTON CROWN FOR AN INTERNAL COMBUSTION ENGINE

BACKGROUND AND SUMMARY

The invention relates to a piston crown for a piston in an internal combustion engine arrangement comprising a cylinder, the piston crown having a piston bowl surface adapted for facing a combustion chamber in said cylinder, wherein the piston bowl surface comprises:

a circumferential rim portion, a floor portion connected to and surrounded by said circumferential rim portion, a plurality of circumferentially spaced protrusions in the circumferential rim portion, and at least one spray impingement portion, located between two adjacent protrusions.

The invention can be applied in internal combustion engine arrangements, in particular in a diesel engine, for all types of vehicles. As such, the invention may be applied in an internal combustion engine arrangement for a heavy vehicle such as a lorry or truck, a construction equipment vehicle, a marine vessel or a car.

In the field of internal combustion engine arrangements, numerous efforts are made to accomplish efficient combustion which is also satisfactory in view of residual products, in particular soot particle and NOx emissions, although also carbon monoxide emissions, and hydrocarbon emissions may naturally be considered.

A combustion process in which the fuel is injected directly into the cylinder and is ignited by increased temperature and pressure in the cylinder is generally referred to as a diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation which causes the gas in the cylinder to expand and which hence causes the piston to move in the cylinder. Depending on a number of parameters, such as the injection pressure of the fuel, the quantity of exhaust gases recirculated to the cylinder, the time of injection of the fuel and the turbulence prevailing in the cylinder, different engine efficiency and emission values are obtained.

The production of soot particles during combustion is a complicated process, where the quantity of soot particles is the net difference between formed soot and oxidised soot. Generally, combustion performed with a fuel-rich fuel/air mixture, insufficient mixing and at high temperature produces high soot formation. However, the formation of soot particles may be counteracted if soot oxidation may be promoted.

During combustion, nitrogen oxides (NOx) are formed from the nitrogen content in the air in a thermal process having a strong temperature dependency, and which inter alia depends on the size of the heated-up volume and the duration of the process.

Also, carbon monoxide emissions (CO) and hydrocarbon emissions (HC) may appear, in particular if unburnt fuel ends up in relatively cool regions of the combustion chamber, such as close to the cylinder wall or in cavities between piston and cylinder lining.

To control and in particular to reduce emissions from the combustion process in a combustion engine, it has been proposed to utilise the shape of the piston bowl surface facing towards the combustion chamber. The piston bowl surface is part of a piston crown of the reciprocating piston in a cylinder. To this end, the piston bowl surface may be designed so as to affect various parameters inside the combustion chamber such as flame propagation, mixing energy, kinetic energy distribution, and/or swirl. Generally, it has been desired to minimise the occurrence of stagnation zones in the combustion chamber.

For certain applications, it has been proposed to use piston crowns comprising circumferentially arranged protrusions or ridges for influencing the conditions inside the combustion chamber.

For example, WO 2011/101154 describes a piston arranged for reciprocal movement in a combustion engine cylinder, wherein, half way between flame plume impingement areas and in a plane perpendicular to said reciprocal movement, there are arranged protrusions or ridges protruding into the combustion chamber.

U.S. Pat. No. 8,499,735 describes another piston, wherein, between spray/flame plume impingement areas and in a plane substantially perpendicular to reciprocal piston movement, there are arranged a first type of protrusions protruding into the combustion chamber, having a smooth form for preserving kinetic energy in the flame and for redirecting circumferential flame progress mainly towards a center axis of the piston with minimal flame-to-flame interaction. Moreover, protrusions of a second type are arranged in the impingement areas, which are adapted for redirecting the flame towards a circumferential flame progress direction.

There is a need to further improve the control of the combustion process in a combustion engine arrangement, or to provide a useful alternative.

It is desirable to provide a piston crown fulfilling the above-mentioned need.

Hence, there is provided a piston crown for a piston in an internal combustion engine arrangement, the piston crown having a piston bowl surface adapted for facing a combustion chamber in said cylinder, wherein the piston bowl surface comprises: a circumferential rim portion, a floor portion connected to and surrounded by said circumferential rim portion and a plurality of circumferentially spaced protrusions in the circumferential rim portion, and at least one spray impingement portion, located between two adjacent protrusions.

The spray impingement portion comprises a reflection surface, being defined by that each possible normal to the reflection surface is directed towards a central axis (A) of the piston, and forming an angle being in the range of a constant angle ±10° with said central axis.

Further, the constant angle is at least 50°.

As implied by the above-mentioned definition, the reflection surface is defined as a portion of the rim surface displaying a variation of ±10° about a constant angle. Also, it is implied in the term "surface" that the reflection surface should have at least some extension along the central axis and circumferentially about the central axis.

The reflection surface in the spray impingement portion is the surface onto which a spray originating from an orifice in an injector is intended to impinge, causing the spray to be reflected. By affecting the way in which the spray is reflected, the shape of the reflection surface will impact the distribution of the kinetic energy inside the combustion chamber.

The provision of a reflection surface as defined in the above in the spray impingement portion may be made in an arrangement of the piston crown together with an injector for injecting a spray along at least one spray vector. Hence, the spray vector will form an angle with the central axis. The reflection surface should be designed in correspondence with the desired spray vector, such that the constant angle of the reflection surface corresponds to the angle which the spray vector forms with the central axis.

In this case, the reflection surface will be generally perpendicular to the spray vector, resulting in the impinging spray being reflected back towards the opposite direction of the spray vector. A reflection angle being defined between the spray vector impinging upon the reflection surface, and a general reflected spray direction, will hence be approximately zero.

This is believed to be particularly advantageous in combination with the spray impingement area being neighbored by protrusions as described in the above.

Indeed, with such a piston crown in an internal combustion engine arrangement, results have been achieved indicating advantageous fuel consumption properties as seen in relation to the compression volume of the internal combustion engine arrangement. Moreover, such an arrangement has been shown to be advantageous in view of soot emissions.

The constant angle being at least 50° implies that the spray vector may form an angle of at least 50° with the central axis.

Accordingly, use of a relatively large angle between the central axis and the injecting spray vector is envisaged. This is believed to be particularly advantageous in combination with the protrusions and the spray impingement areas as described herein, allowing for favorable combustion conditions.

Optionally, the reflection surface substantially has the shape of a portion of an envelope surface of an imaginary cone, preferably a right circular cone. The above-mentioned shape of the reflection surface implies that the impinging spray may be reflected in a desired direction.

Optionally, the imaginary cone has a cone apex and a cone base. The cone apex and the cone base are located on opposite sides of the floor portion, Wherein the floor portion faces the cone base.

Optionally, the constant angle may be at least 60°, preferably at least 70°, most preferred between 70 and 80°.

Optionally, the constant angle may be less than 85°, preferably less than 80°.

According to embodiments, the reflection surface may be defined by that each possible normal to the reflection surface is directed towards a central axis of the piston, and forming an angle being in a range of a constant angle ±5° with said central axis, preferably forming an angle being in the range of a constant angle ±2° with said central axis.

If such a piston crown is arranged with an injector providing a spray vector forming said constant angle with the central axis, this means that a reflection angle being defined between the spray vector impinging upon the reflection surface, and a general reflected spray direction will be limited to 5°, or 2°, respectively (considering the entire reflection surface).

In particular, the reflection surface may be defined by that each possible normal to the reflection surface is forming an angle being the constant angle. In this case, in combination with a spray vector likewise forming the constant angle with the central axis, a reflection angle may be approximately 0°, all over the reflection surface.

In a second aspect, an internal combustion engine arrangement is provided comprising an engine cylinder, a piston crown having a piston bowl surface facing a combustion chamber in said cylinder, the piston bowl surface comprising:

a circumferential rim portion, a floor portion connected to and surrounded by said circumferential rim portion, a plurality of circumferentially spaced protrusions in the rim portion, at least one spray impingement portion, located between two adjacent protrusions, and an injector comprising at least one orifice, said orifice being arranged to inject fuel along a fuel spray vector towards said spray impingement portion.

In the internal combustion engine arrangement, the spray impingement portion comprises a reflection surface, the reflection surface being defined by that each possible normal to the reflection surface forms an angle $\gamma$ with the spray vector of the corresponding injector orifice, as seen in a plane through the central axis, the angle being less than 10°.

Accordingly, a theoretical reflection angle being the difference between the spray vector injected towards the reflection surface, and a spray leaving the reflection surface after having impinged towards it, should be less than 10°.

Advantageously, the angle between each possible normal to the reflection surface and the spray vector of the corresponding injector orifice, as seen in a plane through the central axis is less than 5°, preferably less than 2°.

In particular, the angle between each possible normal to the reflection surface and the spray vector of the corresponding injector orifice, as seen in a plane through the central axis may be essentially zero. In this case, the reflection surface will be formed as a part of a conical surface, for which all possible normals are parallel to the spray vector.

As an alternative, the fuel spray vector forms a spray angle the with the central axis and the constant angle is at least 2°, preferably at least 5°, smaller than the spray angle. This in turn implies that fuel will be reflected towards a position above the injector orifice, as a consequence of which a combustion flame during combustion will form a somewhat sharp angle with the central axis and this may improve the efficiency of the internal combustion engine arrangement.

For both aspects of the invention, whether considering the piston crown only or considering an internal combustion engine arrangement, the following features may be provided.

Generally, the rim portion defines a maximum level of said piston bowl surface along the central axis, and the floor portion defines a minimum level of said piston bowl along the central axis, the piston bowl having a piston bowl extension along said central axis being the difference between said maximum level and said minimum level, and wherein said reflection surface has a reflection surface extension along the central axis.

According to an embodiment, the reflection surface extension is at least 10% of said piston bowl extension, preferably at least 15% of said piston bowl extension.

According to an embodiment, the reflection surface extension is between 15 and 30% of said piston bowl extension, preferably between 20 and 30%, most preferred about 25%.

The axial extension of the reflection surface (the reflection surface extension) should preferably be such that the spray vector will impinge upon the reflection surface during at least a main portion of the injection period. Preferably, the spray vector will impinge upon the reflection surface during the entire injection period. Accordingly, a suitable axial extension of the reflection surface may be selected by considering the injection period and the distance along the central axis which the piston crown will move in relation to an injector orifice during said injection period.

According to an embodiment, the reflection surface extension is extending at a first distance from the minimum level of said piston bowl along the central axis, said first distance being at least 15% of said piston bowl extension, preferably at least 25% of said piston bowl extension, most preferred at least 30%. Advantageously, the first distance may be less than 50% of said piston bowl extension, preferably less than 40%.

The reflection surface will furthermore have an extension along the circumferential direction of the rim portion. The extension along the circumferential direction may be expressed in terms of an angle about the central axis, in a plane perpendicular to said central axis.

The circumferential extension of the reflection surface should generally be selected such that the area provided by the reflection surface is sufficient for the entire spray jet to impinge thereupon.

In an embodiment, the reflection surface may have a circumferential extension of at least 5° about said central axis, in a plane perpendicular to said central axis. Preferably, the circumferential extension is at least 10°, most preferred in the range 10 to 40°. Optionally, the circumferential extension is less than 50°, preferably less than 40°.

In an embodiment, the rim portion may comprise at least two reflection surfaces, more preferred 2 to 10 reflection surfaces, more preferred 4 to 8, most preferred 5 to 7. The amount of reflection surfaces may naturally be adapted to the number of spray jets, i.e. the number of injector orifices of a corresponding injector.

In an embodiment, the reflection surfaces may be located at regular angular intervals about the central axis. Also the location of the reflection surface may naturally be adapted so as to correspond to the location of injector orifices of a corresponding injector.

In an embodiment, all reflection surfaces of the piston crown are uniform.

In an embodiment, at least some of the protrusions are uniform, preferably all of said protrusions of the piston crown are uniform.

In an embodiment, at least the portion that is located closest to the central axis of at least one of said protrusions forms a surface, for which each possible normal forms the same angle as the reflection surface.

Advantageously, the inner shape of the piston bowl may be designed such that the reflection surfaces join smoothly with the protrusions. For example, the reflection surfaces may be seen as portions on a circumferentially extending band, having the axial extension Da and being arranged so as to form a part of the inner contour of the piston bowl, extending around the circumference thereof. Such a band would hence be applied so as to form the contour of the protrusions as well as the reflection surfaces in between the protrusions.

The protrusions will extend towards the central axis A at least a distance Ddiff from the reflection surfaces. For example, the distance Ddiff may be at least 10% of the maximum inner radius of the piston bowl surface, advantageously at least 20%. Preferably, the distance Ddiff may be less than 50% of the maximum inner radius of the piston bowl surface.

Also, the protrusions will have an extension along the circumference of the piston bowl. The extension may be at least 5°, preferably at least 10°, most preferred between 10 and 30°.

In an embodiment, an inner circumferential wall of said piston bowl may consist of or comprise said protrusions and reflection surfaces.

Optionally, the piston bowl surface may comprise a concave surface, positioned between the floor portion and the reflection surface, and a convex surface, positioned between the reflection surface and the circumferential rim portion.

In another aspect, the present disclosure relates to a piston comprising a piston crown in accordance with the above.

In another aspect, the present disclosure relates to an internal combustion engine arrangement comprising an engine cylinder and a piston positioned for reciprocal movement in the engine cylinder along a central axis (A) between a bottom dead center position and a top dead center position, wherein the piston comprises a piston crown as described in the above.

Preferably, the piston crown is arranged in relation to an injector of said combustion engine arrangement, said injector comprising at least one orifice, said orifice being arranged to inject fuel along a fuel spray vector towards said spray impingement portion such that each possible normal to the reflection surface forms an angle with the spray vector of the corresponding injector orifice, as seen in a plane through the central axis, the angle being less than 10°, preferably less than 5°, preferably less than 2°, most preferred substantially 0°.

As already described in the above, an internal combustion engine arrangement wherein the angle between the normal to the reflection surface and the spray vector of the corresponding injector orifice is less than 10°, preferably less than 5°, preferably less than 2°, most preferred substantially 0° may optionally possibly be achieved using a piston crown where the constant angle is more than or equal to 50°.

In another aspect, there is provided a vehicle, preferably a truck, comprising an internal combustion engine arrangement comprising a piston crown as described in the above and/or an internal combustion engine arrangement as described in the above. It will be understood that the present disclosure may also be applied to other engines than a vehicle engine in a truck, e.g. to an engine in a bus, excavator, loader, or other vehicle, or to an engine for marine applications, for providing back-up power etc.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 2b is a perspective view of the piston crown of FIG. 2a

FIG. 3a is a side view as seen from a cross-sectional longitudinal plane through a piston crown in accordance with FIG. 2a;

FIG. 5 is a schematic cross-sectional view of a portion of a piston crown in accordance with FIG. 2a;

DETAILED DESCRIPTION

Figure 6:
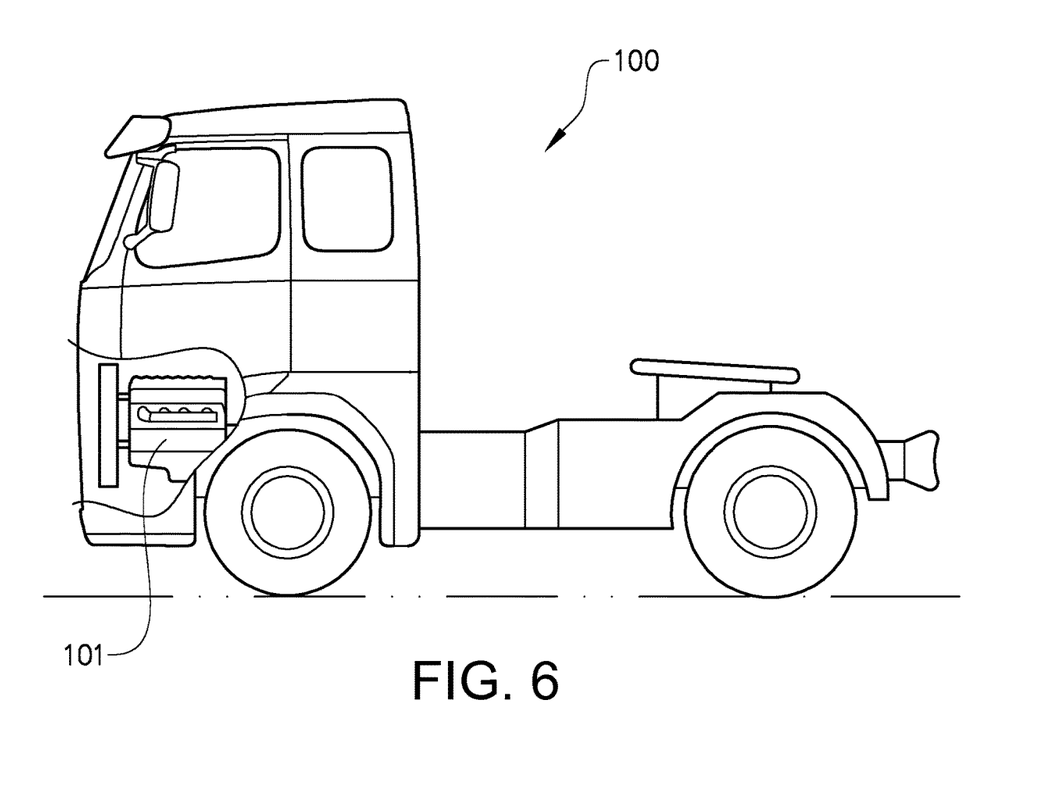
FIG. 6 is a schematic view of a vehicle in which an engine arrangement in accordance with FIG. 1 may be arranged.

FIG. 6 illustrates a vehicle, for example a truck 100, in which an engine 101 comprising an engine arrangement 1 arrangement including a piston crown 3 as described in the below may be arranged.

Figure 1:
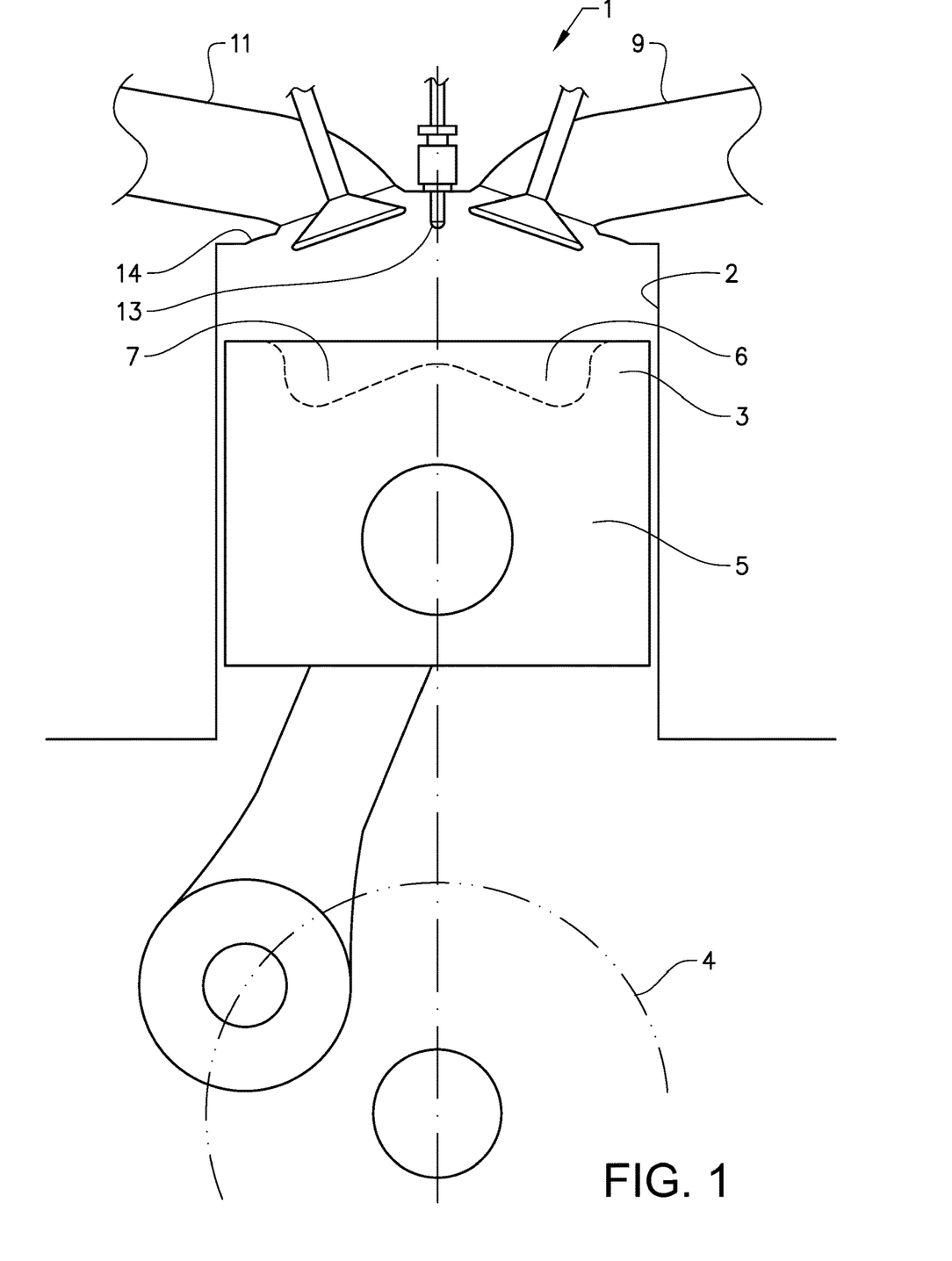
FIG. 1 is a schematic cross-sectional view of an engine arrangement including a piston comprising a piston crown in accordance with an embodiment of the invention.

FIG. 1 illustrates schematically an engine arrangement for an internal combustion engine.

The engine arrangement 1 comprises a cylinder 2 wherein a piston 5 is arranged for reciprocal movement along a central axis A. The piston 5 is mechanically connected to a crankshaft 4 of the engine, so that the piston 5 is movable in the cylinder 2 between an upper and a lower dead centre position.

One end of the cylinder cavity is closed by a engine cylinder head 14.

A combustion chamber facing portion of the piston 5 comprises a piston crown 3, having a piston bowl surface 6 facing the combustion chamber.

Hence, in FIG. 1, the piston bowl surface 6 forms a combustion chamber 7 with the inner surface of the cylinder head 14, and the side wall of the cylinder 2.

In the cylinder head 14, one or more induction ports 9 with corresponding induction valves 10 are arranged. Also arranged in the cylinder head are one or more exhaust ports 11 with corresponding exhaust valves 12.

Moreover, in the cylinder head 14, there is disposed at least one fuel injector 13, through which fuel is injected into the cylinder 2 as a fuel spray. The fuel is preferably injected with a pressure in the range 600 to 3000 bar. Generally, for an engine system using EGR, about 1000 to 2500 bar may be preferred, without EGR about 800 to 1400 bar.

Ignited fuel spray forms a plume in the combustion chamber 7.

The injector 13 comprises at least one, preferably a plurality of injection orifices for permitting the pressurised fuel to flow into the combustion chamber. The injected fuel will thereby provide kinetic energy into the combustion chamber 7, so as to induce thorough mixing of the fuel with the air contained therein.

The injector 13 may be any suitable type of injector capable of injecting fuel.

The fuel injector 13 is preferably centrally disposed in the cylinder head so that a geometrical central axis A of the fuel injector coincides with a geometrical central axis A of the cylinder, which is also an axis of reciprocation of the piston 3.

The combustion engine may advantageously be a four-stroke engine, comprising a plurality of cylinders 2, each provided with a piston 5, wherein each piston 5 for instance may be connected to a common crankshaft 4.

In the illustrated embodiments, the piston crown 3 forms an integral portion of a piston 5. However, it is also conceivable to provide the piston crown 3 as a separate unit, to be attached to one or more piston base portions, so as to form a complete piston 5.

Figure 2A:
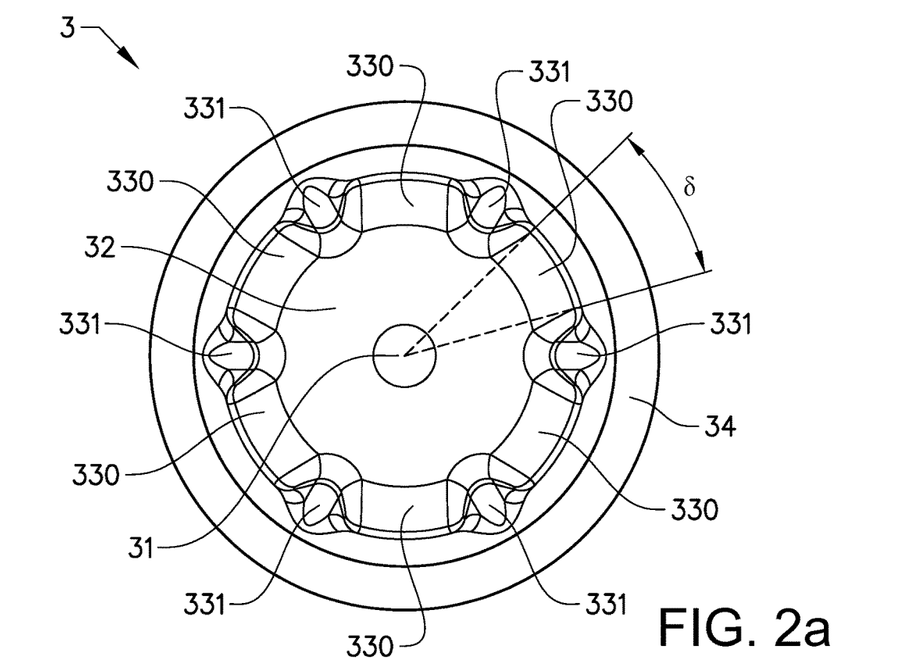
FIG. 2a is a top view of an embodiment of a piston crown in accordance with an embodiment of the invention.
Figure 2B:
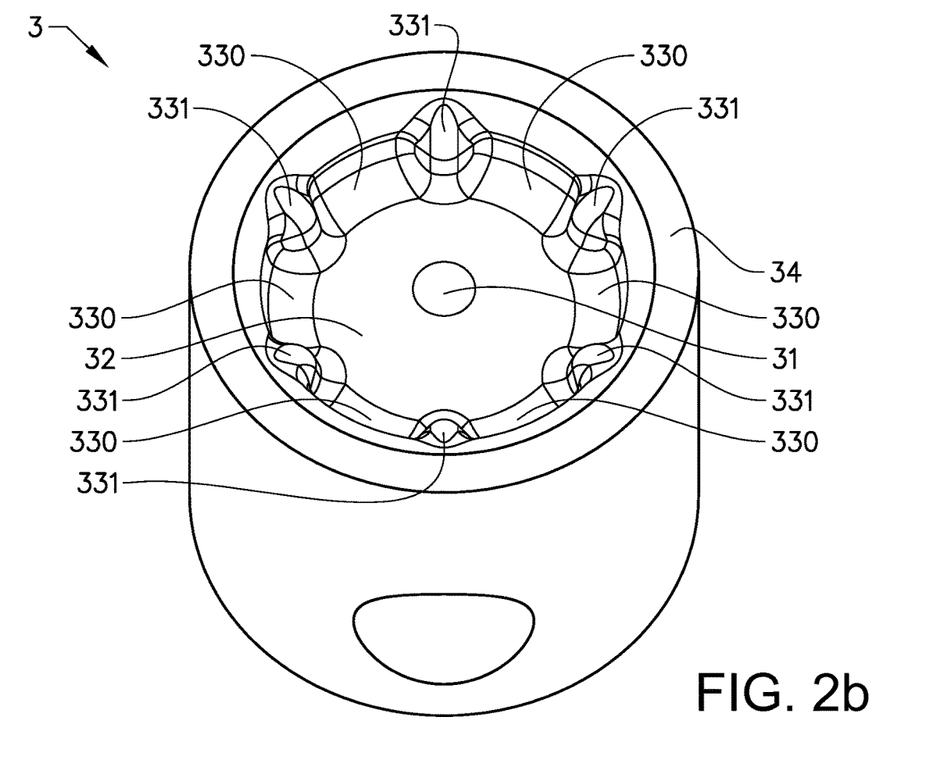
Figure 3A:
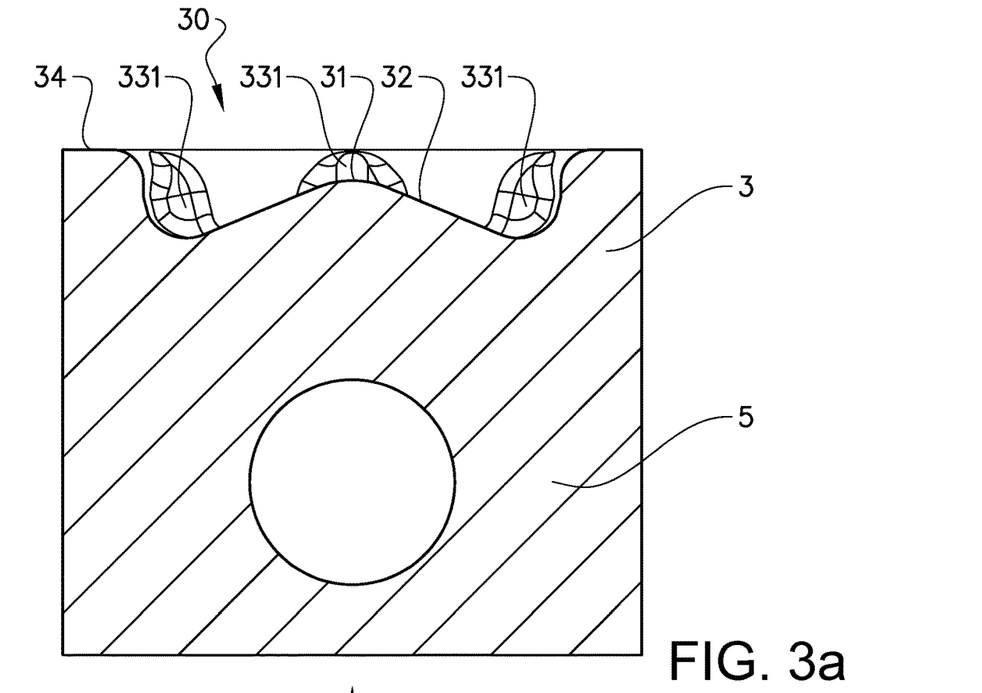

FIGS. 2a, 2b and 3 illustrate the piston crown 3 in more detail. The piston bowl surface 6 facing the combustion chamber 7 when in an engine arrangement 1 as the one exemplified in FIG. 1, comprises a circumferential rim portion 34 and a floor portion 31 connected to and surrounded by the circumferential rim portion 34.

Figure 4A:
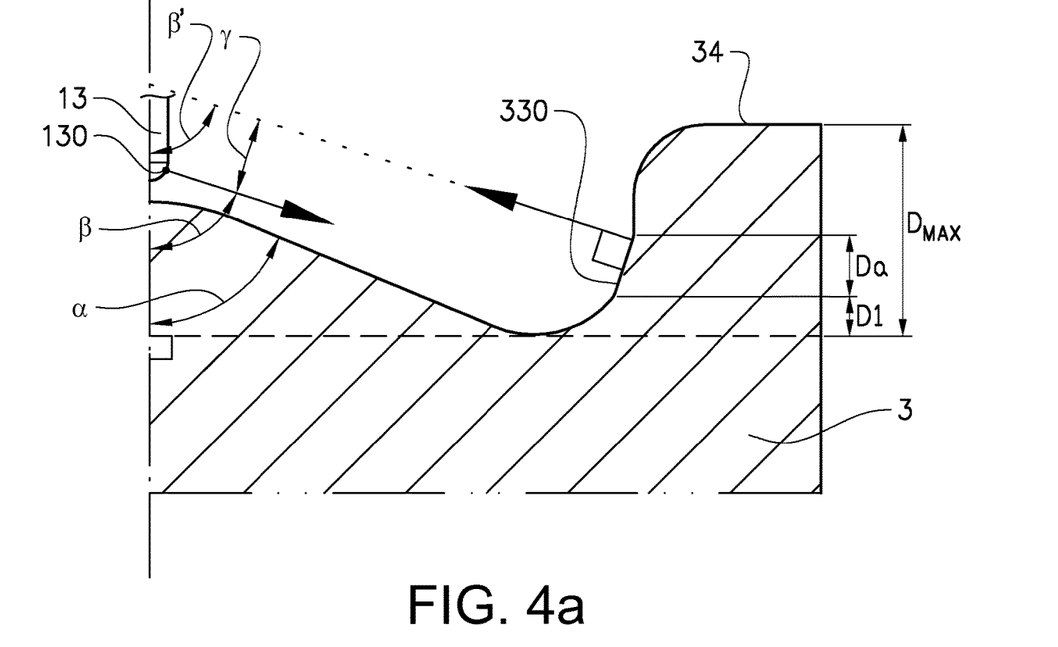
FIG. 4a is another schematic cross-sectional view of a portion of a piston crown in accordance with FIG. 2a, wherein the cross-section at a protrusion is compared to the cross-section at a spray impingement area.

As may be gleaned from FIGS. 3a and 4, the floor portion 31 may be generally dome-shaped with a central apex coinciding with the central axis A of the piston 3. The floor portion 31 may form dome side surfaces 32 extending circumferentially from said dome-shape, and forming a dome angle being 2× the angle α between them. Said angle α may advantageously be between 60 and 85°. In the illustrated embodiment, the angle α is about 75°.

The circumferential rim portion 34 may comprise a plurality of circumferentially spaced protrusions 331. Each protrusion 331 extends from the adjacent sides of the rim portion 34 toward the central axis A of the piston crown, forming an apex towards the central axis A.

In the illustrated embodiment, the rim portion 34 comprises a total of six protrusions 331, equally distributed around the circumference of the piston crown. However, as explained in the above, other numbers of protrusions 331 are conceivable.

As illustrated in FIG. 2, alternately with the protrusions 331, the rim portion 34 forms reflection surfaces 330, intended to constitute spray impingement areas. Hence, in the illustrated embodiment, six spray impingement areas are formed.

Generally, it may be preferred to arrange protrusions 331 alternately with the reflection surfaces 330, resulting in an equal number of protrusions 331 and reflection surfaces 330.

However, reflection surfaces 330 may also be provided between only some of the possible pairs of protrusions 331 formed in the rim 34. For example, with six protrusions 331 only three reflection surfaces 330 may be arranged.

The suitable number and location of reflection surfaces 330 may naturally be determined so as to correspond to the number and location of spray orifices 330 in an injector to be used in combination with the piston crown.

The purpose of the reflection surfaces 330 being, as described in the above, to enhance kinetic energy distribution in the combustion chamber et. al. by directing flow towards the protrusions, implies that each reflection surface 330 should be located between two such protrusions 331.

FIG. 4a is a partial cross-section through the piston crown 3 at a reflection surface 330, and illustrates the reflection surface 330 in more detail. According to the definition thereof, the reflection surface 330 is a portion of the rim 34 wherein all the angles (β') formed between the all normals N to the rim surface 34 and the center axis A lie in a range of ±10° from a selected constant angle, and where said selected constant angle is at least 50°.

If considering a spray vector v, illustrating the direction of a fuel spray being injected from an injector orifice 130, such a spray vector v will impinge on the rim portion 34. It will be understood, that since all normals N to the reflection surface 330 form essentially the same (±10°) angle to the spray vector v, the spray vector v will be reflected in the same manner regardless of where along the essentially conical portion the collision with the rim portion 34 takes place.

Figure 3B:
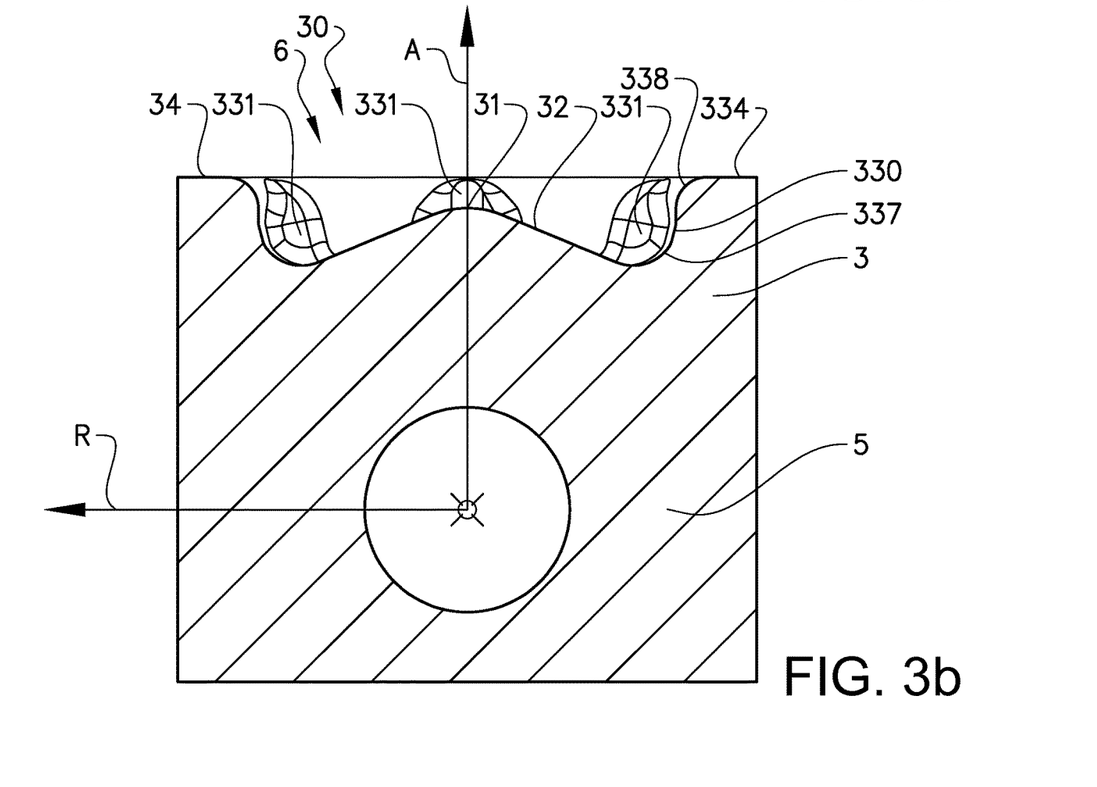
FIG. 3b illustrates additional features of the FIG. 3a embodiment.

Turning to FIG. 3b, it is illustrated therein that the piston bowl surface 6 may comprise a concave surface 337, positioned between the floor portion 31 and the reflection surface 330, and, a convex surface 338, positioned between the reflection surface 330 and the circumferential rim portion 334. Purely by way of example, the concave surface 337 and/or the convex surface 338 may be suitable for directing fuel, that does not impinge the reflection surface 330, in appropriate directions.

FIG. 3b illustrates a cross-section of the piston crown in a plane wherein the central axis A forms one of the plane axis. The other plane axis is a radial axis R.

As seen in the above plane, and as is exemplified in FIG. 3b, the concave surface 337 may be such that a line (not shown) connecting two points on the concave surface 337 is located outside the piston crown. Further, as another non-limiting example, the convex surface 338 may be such that a line (not shown) connecting two points on the convex surface 338 is located within the piston Crown.

As a non-limiting example, and as is illustrated in FIG. 3b, the concave surface 337 may be adjacent the reflection surface 330. Moreover, the reflection surface 330 may be adjacent the convex surface 338.

Preferably, the extension Da along central axis A of the essentially conical portion 30 is such that a spray injected via the orifice 130 impinges somewhere along the essentially conical portion throughout the injection period.

Figure 3C:
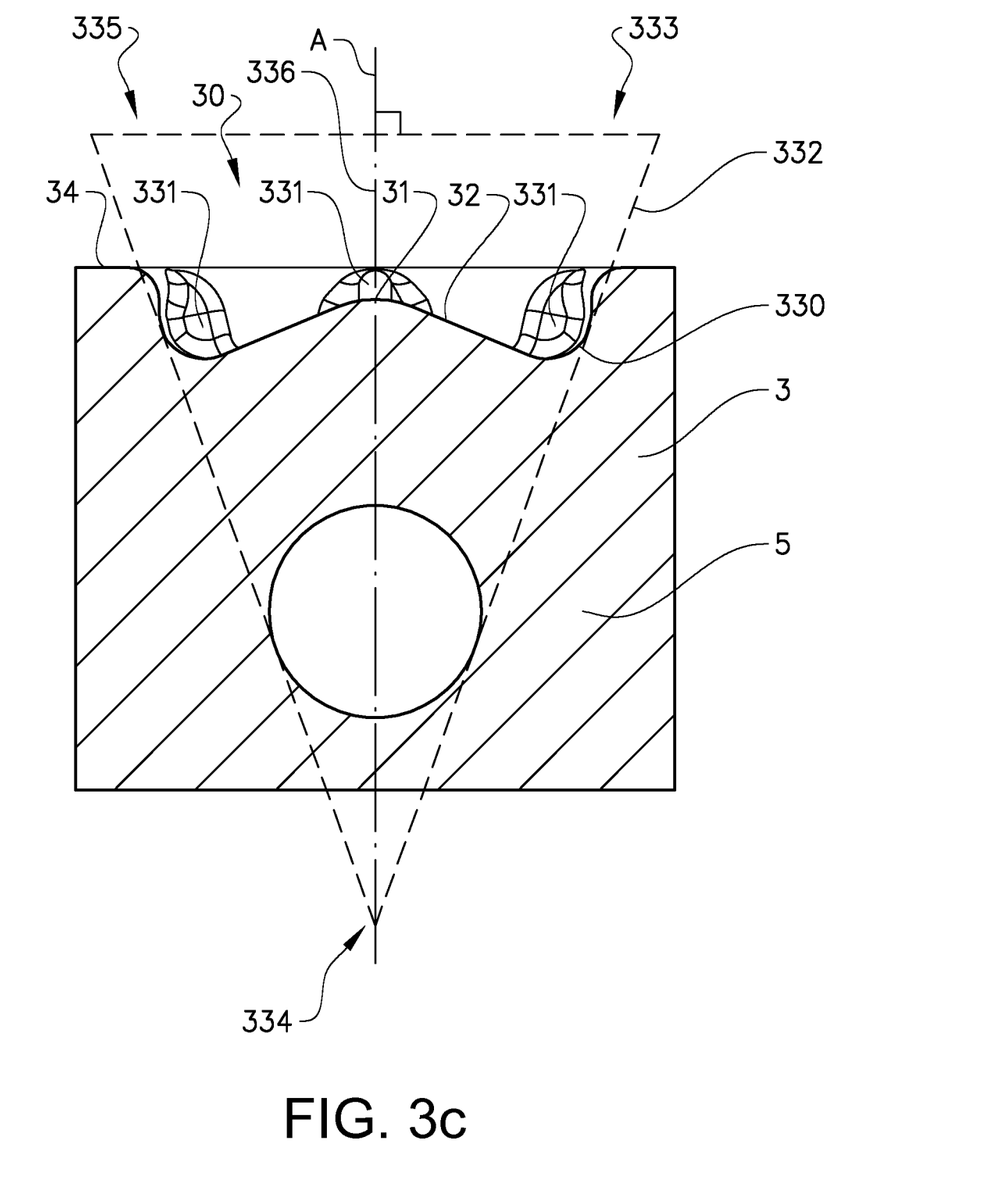
FIG. 3c illustrates another embodiment of a piston crown, further illustrating an imaginary cone extending through the piston crown.

To this end, FIG. 3c illustrates a piston crown embodiment in which the reflection surface 330 substantially has the shape of a portion of an envelope surface 332 of an imaginary cone 333, preferably a right circular cone.

As used herein, the expression "right circular cone" is intended to mean that the cone has a circular base and a cone axis passing through the centre of the base at right angles to the base plane.

For instance, and as is illustrated in the FIG. 3c example, the imaginary cone 333 has a cone apex 334 and a cone base 335, which cone base 335 in the FIG. 3c example is circular. The cone apex 334 and the cone base 335 are located on opposite sides of the floor portion 31 and the floor portion 31 faces the cone base 335. Moreover, the imaginary cone 333 has a cone axis 336 extending at a right angle from the centre of the cone base 335 towards the cone apex 334. In the FIG. 3c example, the cone axis 336 coincides with the central axis A.

As illustrated in FIG. 4a, the spray vector v forms a spray angle β with the central axis A, said spray angle β being determined by the spray orifice 130. The constant angle should be adjusted to the spray impingement angle β such that the constant angle is equal to the spray impingement angle β. In this case, a reflection angle γ being an angle formed between the constant angle and the spray impingement angle β, should be relatively small, preferably within the range of ±5°, most preferred substantially zero.

E.g. zero reflection angle γ corresponds to the spray being directed back towards the spray vector angle after impact on the rim portion 24 of the piston crown 3. This leads to an enhanced distribution of kinetic energy, and in particular to the effect of the protuberances in the combustion chamber being enhanced.

Figure 4B:
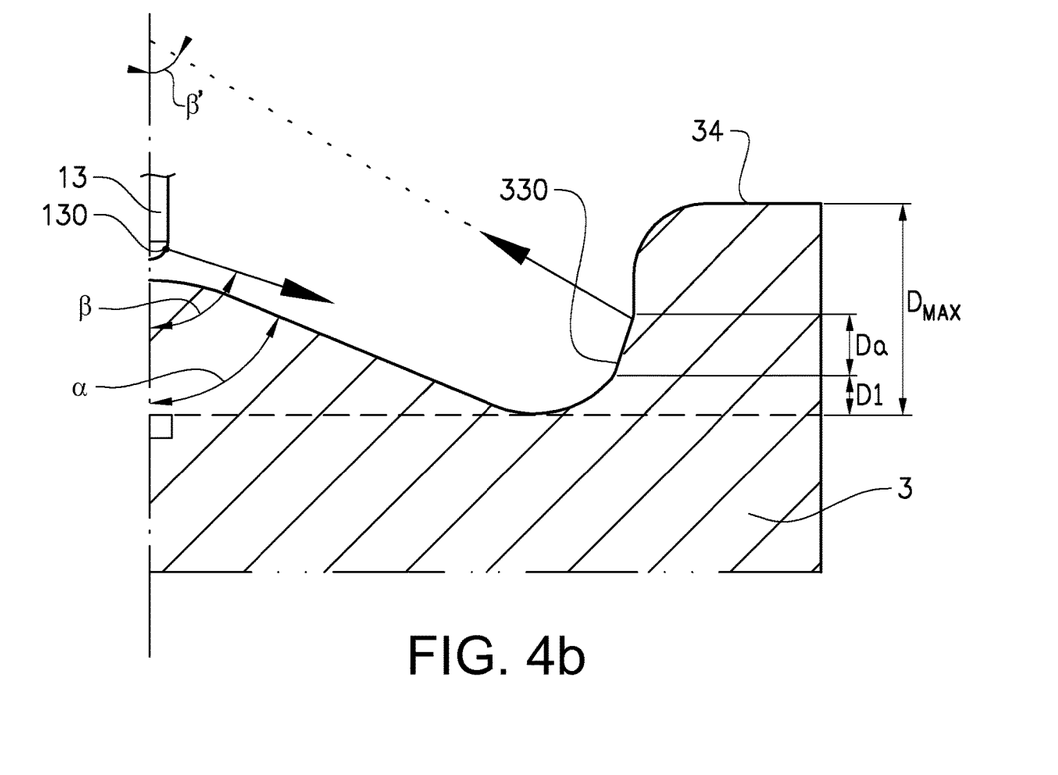
FIG. 4b is another schematic cross-sectional view of a portion of another embodiment of a piston crown, wherein the cross-section at a protrusion is compared to the cross-section at a spray impingement area.

FIG. 4b illustrates another embodiment of the internal combustion engine arrangement 1. In FIG. 4b, the fuel spray vector again forms a spray angle β with the central axis A. However, in the FIG. 4b embodiment, the constant angle β' is at least 2°, preferably at least 5°, smaller than the spray angle β. As such, and as is indicated in FIG. 4b, fuel reflected form the FIG. 4b reflection surface 330 will be angled slightly more upwards, as seen in the FIG. 4b view, as compared to a direction opposite to the direction of the fuel spray vector.

It follows from the term "reflection surface" that the section must have a certain axial extension Da along the central axis A and a certain circumferential extension Dc along a circumference about the central axis A, or else there would not be any reflection surface.

The amount of these extensions may be determined having the intended operation of the combustion engine in mind, i.e. such that spray injected by the injector will be able to impinge upon the reflection surface at least during the injection period, while the piston will be moving in relation to the injector.

Hence, an appropriate axial extension of the reflection surface. Da may be set considering the injection period, start of injection, location and speed of the piston in relation to the injector during the fuel injection.

To this end, as a non-limiting example and using FIG. 4a for illustrating such an example, the axial extension of the reflection surface Da may be such that spray injected by the injector will be able to impinge upon the lower portion of the reflection surface 330, as seen in FIG. 4a, when the piston 5 is in its top position, i.e. at top dead centre. After reaching the top dead centre, the piston moves away from the injector and when the injector 13 is about to ceases fuel discharge, which cessation for instance may be set to occur at a crank angle of about 20-25° after top dead centre, the last portion of the feel discharged from the injector 13 will impinge upon the upper portion of the reflection surface 330.

As used herein, the lower portion of the reflection surface 330 may be defined as the portion of the reflection surface 330 being located closest to the floor portion 31, following the piston bowl surface 6 from the floor portion 31 to the reflection surface 330. In a similar vein, the upper portion of the reflection surface 330 may be defined as the portion of the reflection surface 330 being located farthest away from the floor portion 31, following the piston bowl surface 6 from the floor portion 31 past the reflection surface 330.

As illustrated in FIG. 4a, the floor portion 31 of the piston bowl surface 6 defines a minimum level of the piston bowl surface 6, as seen along the axis A, and the rim portion 34 defines a maximum level of the piston bowl surface 6. The distance between the maximum level and the minimum level is referred to as a piston bowl extension Dmax.

The axial extension Da of the reflection surface may be expressed in relation to said piston bowl extension Dmax, and may be at least 10% of the piston bowl extension. In the illustrated embodiment, the axial extension Da of the reflection surface is about 25% of the piston bowl extension Dmax.

As illustrated in FIG. 4a, the reflection surface 330 may be located so as to begin its extension at a distance D1 from the minimum level of the piston bowl surface 6. This may be preferred since the distance D1 provides a space between the reflection surface 330, where the fuel spray is to impinge, and the floor portion 31 of the piston bowl surface 6. Such a space might be important for the creation of turbulence in the spray.

To this end, the reflection surface 330 may be located so as to begin its extension at a distance D1 being at least 15% of the piston bowl extension Dmax. In the illustrated embodiment, D1 is about 20% of the piston bowl extension Dmax.

Similarly, the reflection surface 330 may be located so as to end its extension at a distance D2 from the maximum level of the piston bowl surface 6. The distance D2 may be at least 10% of the piston bowl extension Dmax, preferably between 15 and 60%.

As indicated over one of the exemplary reflection surfaces 330 in FIG. 2, the reflection surface 330 may have a circumferential extension (Dc) about the central axis (A). The circumferential extension (Dc) may be expressed as a circumferential extension angle (δ), as seen in a plane perpendicular to the central axis A.

The circumferential extension angle (δ) may be at least 5°, preferably at least 10°, most preferred between 10 and 40°, or even between 20 and 35°. In the illustrated embodiment, the circumferential extension angle (δ) is about 30°.

In the embodiment illustrated in FIG. 2, the reflection surfaces 330 are located at regular angular intervals about the central axis (A). For the location of a reflection surface 330 to be determined, the centre of such a section should be considered, i.e. the intersection between a midpoint of the axial extension Da and the circumferential extension Dc.

It will be understood that the locations about the central axis (A) of the reflection surfaces 330 should be determined so as to correspond with the locations of the spray orifices 130 of an injector 13 to be used with the piston crown.

In the embodiment illustrated in FIG. 2, the reflection surfaces 330 are distributed around the central axis A with 60° intervals.

Preferably, and as illustrated in FIG. 2, all of the reflection surfaces 330 are uniform. In other words, the reflection surfaces 330 display the same selected angle (β'), with the same variation, they display the same axial extension Da and circumferential extension Dc.

Moreover, it is preferred that the reflection surfaces 330 constitute all of the impingement areas of the piston crown. In other words, when in an arrangement with an injector 13, all fuel sprays injected by the injector 13 will impinge upon a reflection surface 330.

Each protrusion 331 forms an apex towards the central axis A in accordance with previously known technology. It has been found to be advantageous, if at least a portion of the apex of the protrusions 331 forms a surface for which the normal forms the same selected angle to the central axis A as the reflection surfaces 330.

Figure 5:
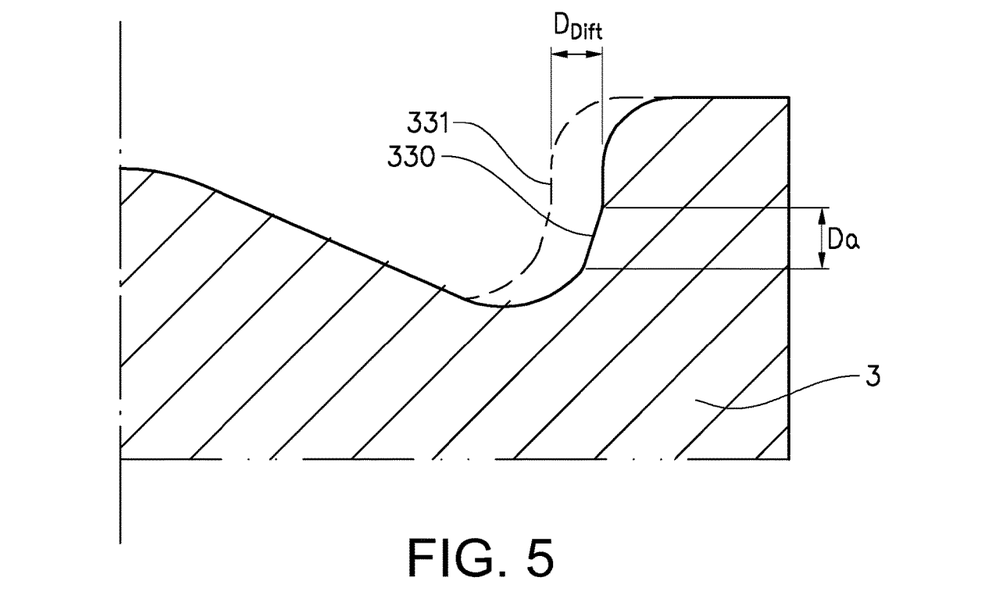

As illustrated in FIG. 5, this would mean that a normal to the protrusion apex would extend essentially in parallel to a normal of the reflection surface 330.

The axial extension and location of such a surface of the protrusion 331 may preferably correspond to the axial extension Da and location of the reflection surface 330, or at least overlap thereto.

As also illustrated in FIG. 5, the protrusions will extend towards the central axis A at least a radial distance Ddiff from the reflection surfaces. For example, the radial distance Ddiff may be at least 10% of the maximal inner radius of the piston bowl surface 6, advantageously at least 20%. Preferably, the radial distance Ddiff may be less than 50% of the maximal inner radius of the piston bowl surface 6.

Also, the protrusions will have an extension along the circumference of the piston bowl. The extension may be at least 5°, preferably at least 10°, most preferred between 10 and 30°.

In the illustrated embodiment, the inner circumferential wall of the piston bowl surface 6 consists of or comprises said protrusions 331 and reflection surfaces 330.

As indicated in the Figures, it is understood that the angles α, β, β' referred to herein, which relate to angles formed with the central axis A of the piston crown 3, are all measured as seen towards the direction of the piston 5 of the central axis A.

It is to be understood that the present invention is not limited to the embodiments described above and illustrated in the drawings; rather, the skilled person will recognize that many changes and modifications may be made within the scope of the appended claims.

In particular, and as outlined in the above, the number of reflection surfaces and protrusions may be varied. Moreover, the dimensions of various features may be adapted to suit particular circumstances.

The invention claimed is:

1. An internal combustion engine comprising an engine cylinder and a piston positioned for reciprocal movement in the engine cylinder along a central axis between a bottom dead center position and a top dead center position, wherein the piston comprises a piston crown having a piston bowl surface adapted for facing a combustion chamber in the cylinder, wherein the piston crown is arranged in relation to an injector of the combustion engine arrangement, the injector comprising at least one orifice, the orifice being arranged to inject fuel along a fuel spray vector towards a spray impingement portion, wherein the piston bowl surface comprising: a circumferential rim portion, a floor portion connected to and surrounded by the circumferential rim portion a plurality of circumferentially spaced protrusions in the circumferential rim portion, at least one spray impingement portion, located between two adjacent protrusions, wherein the spray impingement portion comprises a reflection surface that substantially has a shape of a portion of an envelope surface of an imaginary cone, being defined by that each possible normal to the reflection surface is directed towards a central axis of the piston, and forming an angle being a constant angle ±2° with the central axis wherein the constant angle is at least 50°, wherein the rim portion defines a maximum level of the piston bowl surface along the central axis, and the floor portion defining a minimum level of the piston bowl surface along the central axis, the piston bowl having a piston bowl extension along the central axis being the difference between the maximum level and the minimum level, and wherein the reflection surface has a reflection surface extension along the central axis, the reflection surface extension being at least 10% of the piston bowl extension, the fuel spray vector forms a spray angle (β) with the central axis, the constant angle being at least 2° smaller than the spray angle (β).

2. The internal combustion engine according to claim 1, wherein the imaginary cone is a right circular cone.

3. The internal combustion engine according to claim 2, wherein the imaginary cone has a cone apex and a cone base, the cone apex and the cone base being located on opposite sides of the floor portion, the floor portion facing the cone base.

4. The internal combustion engine according to claim 1, wherein the reflection surface extension is between 15 and 30% of the piston bowl extension.

5. The internal combustion engine according to claim 1, wherein the reflection surface extension is extending at a first distance from the minimum level of the piston bowl surface along the central axis, the first distance being at least 15% of the piston bowl extension.

6. The internal combustion engine according to claim 1, wherein the constant angle is at least 60°.

7. The internal combustion engine according to any one of the preceding claims, wherein the constant angle is less than 85°.

8. The internal combustion engine according to claim 1, wherein the reflection surface has an extension along the circumferential direction of the rim portion corresponding to an angle of at least 5°, about the central axis, in a plane perpendicular to the central axis.

9. The internal combustion engine in accordance with claim 1, wherein the rim portion comprises at least two reflection surfaces.

10. The internal combustion engine in accordance with claim 1, wherein the reflection surfaces are located at regular angular intervals about the central axis.

11. The internal combustion engine in accordance with claim 1, wherein all reflection surfaces of the piston crown are uniform.

12. The internal combustion engine in accordance with claim 1, wherein at least some of the protrusions are uniform, preferably all of the protrusions of the piston crown are uniform.

13. The internal combustion engine in accordance with claim 1, wherein at least the portion that is located closest to the central axis of at least one of the protrusions forms a surface, for which each possible normal forms the same angle as the reflection surface.

14. The internal combustion engine in accordance with claim 1, wherein the piston bowl surface comprises a concave surface, positioned between the floor portion and the reflection surface, and a convex surface, positioned between the reflection surface and the circumferential rim portion.

15. A vehicle comprising an internal combustion engine in accordance with claim 1.

* * * * *